Nov. 12, 1957 J. C. CHUPA 2,812,551
METHOD OF MAKING INFLATED ARTICLES
Filed March 2, 1955 2 Sheets-Sheet 1
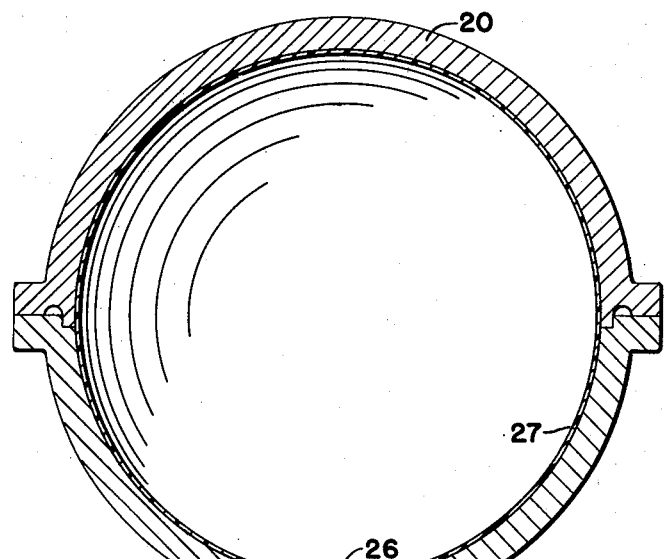
FIG. 2
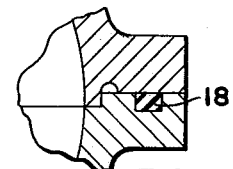
FIG. IA
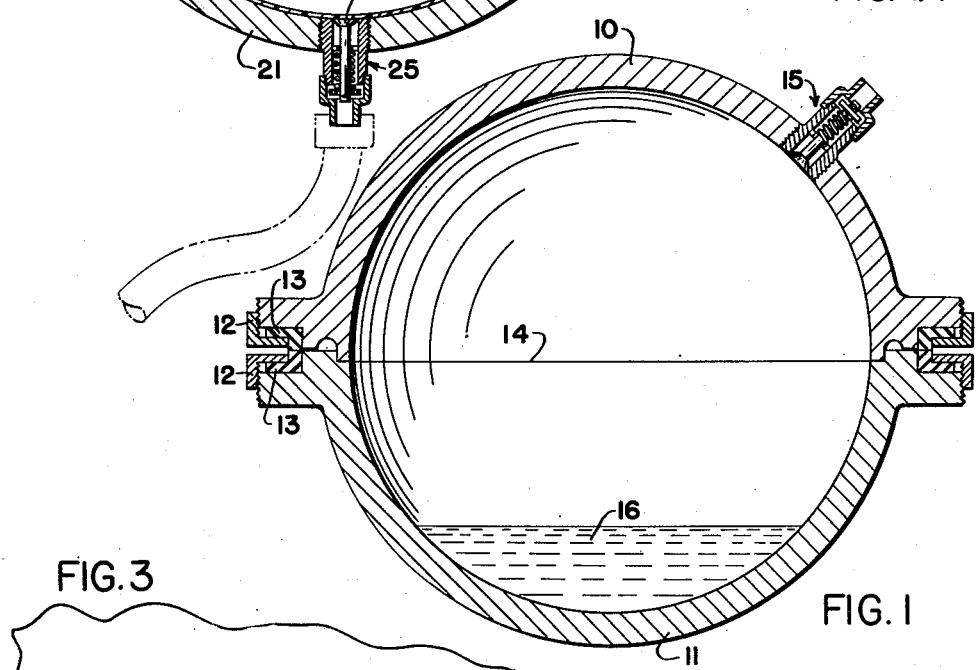
FIG. I
FIG. 3
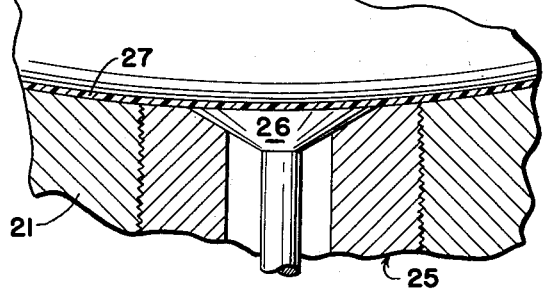
INVENTOR.
JOHN C. CHUPA
BY
Ely, Prye & Hamilton
ATTORNEYS Nov. 12, 1957    J. C. CHUPA    2,812,551
METHOD OF MAKING INFLATED ARTICLES
Filed March 2, 1955    2 Sheets-Sheet 2

INVENTOR.
JOHN C. CHUPA
BY
*Ely, Frye & Hamilton*
ATTORNEYS

United States Patent Office 2,812,551
Patented Nov. 12, 1957

2,812,551

METHOD OF MAKING INFLATED ARTICLES

John C. Chupa, Sandusky, Ohio, assignor to The Barr Rubber Products Company, Sandusky, Ohio, a corporation of Ohio Application March 2, 1955, Serial No. 491,721

1 Claim. (Cl. 18—58)

The present invention relates to hollow balls and toys and similar hollow articles and to their manufacture from suitable liquid mixes such as (1) synthetic resins combined with suitable plasticizers and other ingredients, particularly polyvinyl chloride and similar vinyl polymers and copolymers combined with plasticizers, commonly known in the art as "vinyls," or (2) latex or like aqueous dispersions of rubber or rubber-like material, commonly known in the art as "latex."

An object of the invention is to provide manufacturing methods which result in the production of articles of superior quality and longer service life as compared to articles of the type described which have heretofore been manufactured.

Another object of the invention is to provide for the manufacture of articles of the type described in such a manner that the walls thereof may be subjected to a compression or densifying pressure during casting and gelling thereof.

As is well known in the art, the liquid mixes commonly employed in the production of hollow inflated articles to which the invention relates are generally characterized by an ability to be gelled or set in a solid or semi-solid state and to be thereupon cured by the further application of heat. One method of forming such articles is known in the art as rotary casting. In this method, a measure of the liquid mix is placed in a hollow mold which is then rotated about a plurality of axes or otherwise agitated to cause the mix to distribute itself over the interior surface of the mold. Heat is then applied to gel the distributed mix.

The present invention involves the concept of pre-inflating the article to be formed—that is, pressurizing the mold interior either prior to partial forming of the article or prior to complete forming of the article. The walls of the final product are subjected to the pressure of the contained gas or fluid during their very formation from the liquid mix.

The above and other objects and advantages of the invention will be more clearly understood from the following specification of the invention and the accompanying drawings, in which:

Figure 1 illustrates in cross-section a mold structure which may be employed in the practice of the invention.

Figure 1A is a fragmentary view showing an alternative detail of the mold structure illustrated in Figure 1.

Figure 2 illustrates in cross-section another mold structure which may be employed in the practice of the invention.

Figure 3 is a view on an enlarged scale of one portion of the wall of the mold shown in Figure 2.

Figure 4:
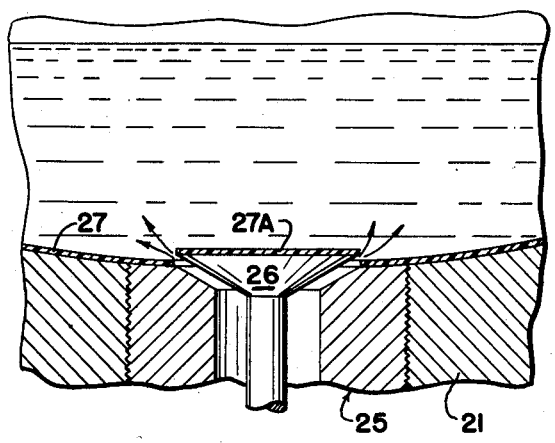
Figure 4 is a view similar to Figure 3 at a later stage of operation.

Figure 1 illustrates a sectional mold structure which comprises the mold halves 10 and 11. The flange of each mold half is provided with a retaining ring 12, each retaining ring securing in place a sealing gasket 13. The gaskets 13 comprise a resilient sealing material adapted to establish an air-tight seal around the parting line zone of the mold. The gaskets 13 must withstand the elevated temperatures to which the mold is exposed. They may comprise a conventional silicon rubber of the type now widely used in high-temperature applications in many fields, particularly the aircraft field.

Another air seal is shown in Figure 1A. This simply comprises a silicon rubber ring 18 positioned in a groove on one of the mold flanges, as shown. When the mold is open, the ring 18 extends slightly above the surface in which the groove is cut.

It will be understood that it may be possible to so precisely form the parting line 1A of the mold that an air seal will be maintained at this line without the necessity of any additional sealing means. However, in the provision of molds for production use, this will not generally be feasible.

An air valve 15 is provided in the mold wall. This valve may comprise a conventional tire valve. It is preferable that the valve, in closed position, define a continuation of the inner mold surface, although a projection or particularly a depression on the mold wall is not highly objectionable.

In the production of inflated objects, the mold is opened, a charge 16 is placed therein and the mold is closed. Air is then injected through the valve 15 into the interior of the mold and the mold is rotated around a plurality of axes, or the charge is otherwise distributed on the inner surface of the mold and caused to set or gel thereon by the application of heat or the exposure or subjection of the mix to heat according to the techniques which will be familiar to those in the art. The formed pressurized article may be removed from the mold for curing, or, if the wall strength of the formed uncured article is not sufficient to permit this, the article may be cured before removal from the mold.

Figure 5:
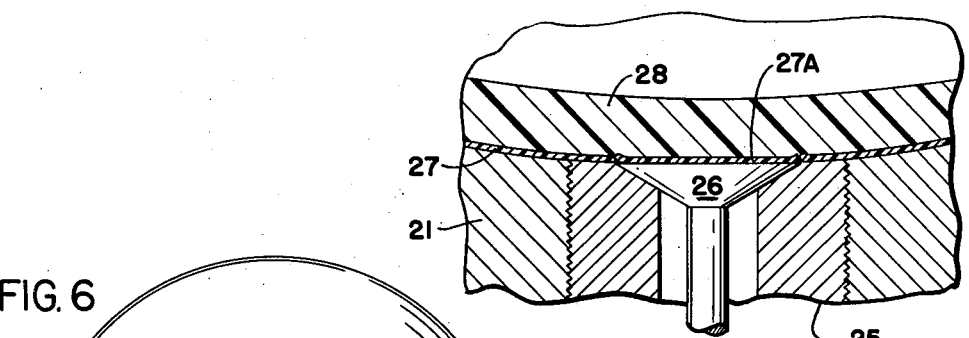
Figure 5 is a view similar to Figure 3 at a still later stage of operation.

Figure 2 illustrates a mold which comprises the mold halves 20 and 21. An air valve 25 is provided in the mold wall. In this modification, the element 26 of the air valve plays a significant part. When articles are being produced, a small charge is placed in the mold and cast and gelled by conventional methods to form a thin skin 27. The mold is then opened, causing the thin skin to rupture along the parting line of the mold. A relatively large charge of the order of volume of the charge 16 is then placed in the mold and the mold is closed. The ruptured edges of the skin 27 come back together to a sufficient extent, and the characteristics of the skin gel as to plasticity and flowability are such in most conventional mix formulations that an air seal is established around the parting line of the mold. At this stage, the skin 27 lies across the valve member 26 as shown in Figure 3. Air is then injected through the valve 25, and the member 26 is raised as shown in Figure 4. As the member 26 rises, it carries a portion 27A of the gel 27 with it, as shown. When air injection is completed, the member 26 is seated. The mold is rotated around a plurality of axes, or the newly added relatively large charge is otherwise distributed over the inner faces of the mold, becoming fused with the thin skin 27 and forming the wall 28 as indicated in Figure 5. The formed article may be removed from the mold for curing, or, if the wall strength of the formed secured article is not sufficient to permit this, the article may be cured before removal from the mold.

It will be noted that with the bottom position of the valve 25 as shown in Figure 2, air injected through the valve will pass through the relatively large charge of mix. If it is desired to avoid this, the valve 25 may be positioned at an upper zone of the mold so long as the gelled skin 27 is of such nature that the portion 27A will remain in place on the member 26 by weak adhesion, which will be the case for a number of conventional mix formulations.

Figure 6:
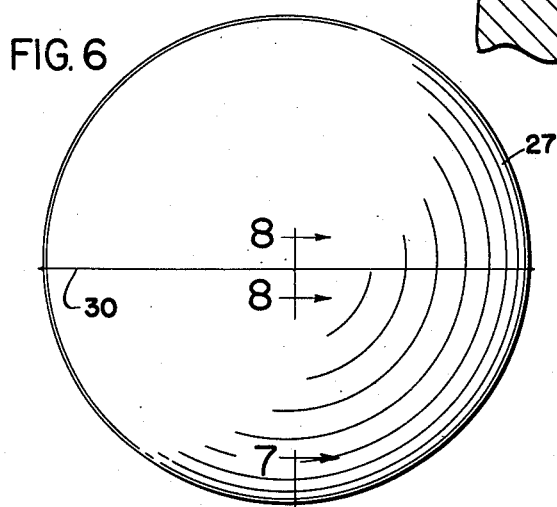
Figure 6 is a view of a completed article formed according to the invention.
Figure 7:
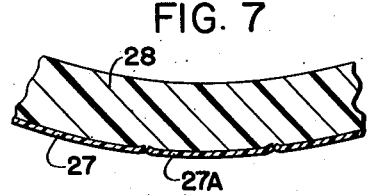
Figure 7 is a fragmentary view in section on an enlarged scale taken on line 7—7 in Figure 6.
Figure 8:
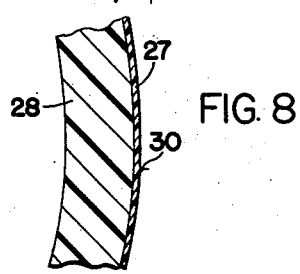
Figure 8 is a fragmentary view in section on an enlarged scale taken on line 8—8 in Figure 6.

The final cured or uncured product as removed from either the mold shown in Figure 1 or that shown in Figure 2 will appear much as shown in Figure 6, there being only a small flash 30 to buff off or otherwise remove. The article formed in the mold shown in Figure 2 will appear in detailed section as shown in Figures 7 and 8.

It should be apparent that molding according to the present invention may be performed either manually or to any desired degree of automation. It is particularly to be noted that, where gangs of molds are mounted on common mold plates or other mounting members for simultaneous actuation, an air distributor for all the molds may be provided so that injection through one common line will pressurize all the molds at once.

The above disclosure will suggest to the art many alternatives in details which will accomplish substantially the same results in substantially the same way. Accordingly, the invention is not limited to the specific details of the above disclosure but is defined by the scope of the following claim.

What is claimed is:

In the manufacture of pressurized hollow articles, the process comprising the steps of gelling a relatively small measure of a heat-gelling liquid mixture against the mold surfaces of a hollow sectional mold to form a thin skin with flash at the parting line of the mold, opening the mold whereby said skin is torn at the parting line, placing a relatively large measure of a heat-gelling liquid mixture of a vinyl resin and a plasticizer therefor in said mold, closing the mold, inserting a member into the interior of said mold through said skin to lift a plug from said skin inwardly into the mold and injecting pressurized air through the hole thereby formed, withdrawing said member to the mold surface to position said plug in said hole and leave the interior of said mold pressurized, and gelling said relatively large measure of a liquid mixture over the entire inner surface of said skin.

References Cited in the file of this patent

UNITED STATES PATENTS

| | | |
|---|---|---|
| 2,035,774 | Trobridge et al. | Mar. 31, 1936 |

FOREIGN PATENTS

| | | |
|---|---|---|
| 409,311 | Great Britain | Apr. 27, 1934 |
| 413,849 | Great Britain | July 26, 1934 |